April 3, 1951 K. K. HARWORTH ET AL 2,547,207
PIT INSPECTOR
Filed March 30, 1948
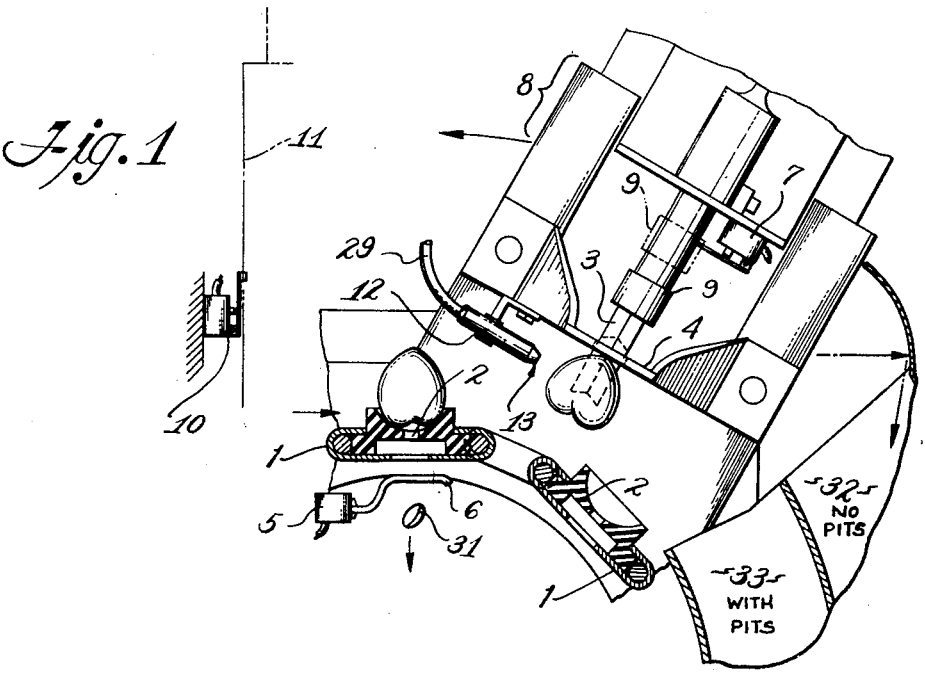
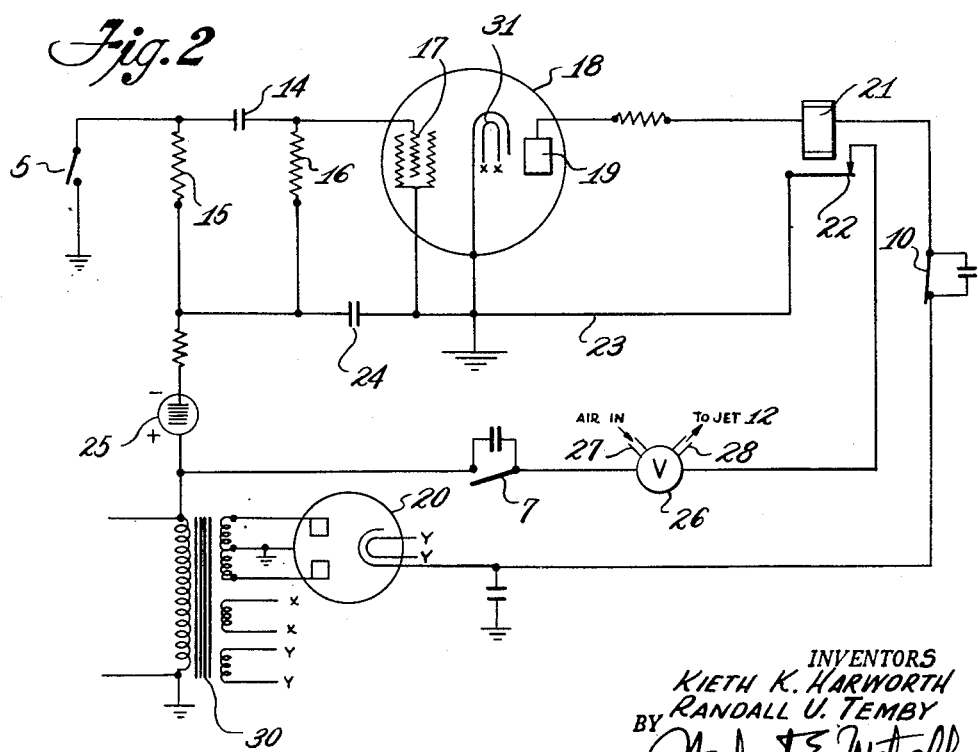
INVENTORS
KIETH K. HARWORTH
BY RANDALL U. TEMBY
Herbert E. Metcalf
Attorney

Patented Apr. 3, 1951

2,547,207

UNITED STATES PATENT OFFICE 2,547,207

PIT INSPECTOR

Keith K. Harworth, Menlo Park, and Randall U. Temby, Sunnyvale, Calif.

Application March 30, 1948, Serial No. 17,838

5 Claims. (Cl. 146—19)

The present invention relates to inspectors for fruit pitting machines, and more particularly to a means and method of determining whether or not the pit has been removed from a fruit operated on by a pitting tool. The invention further relates to a means and method of separating unpitted from pitted fruit.

In machines designed for pitting fruit, such as cherries, for example, a small percentage of fruit will ordinarily fail to be pitted by the action of the pitting tool, and this unpitted fruit will pass into the output. Consequently, it is either necessary to inspect the entire output for the presence of the few unpitted fruit, a costly procedure, or to let the entire output go into commerce, where eventually the presence of pits causes much inconvenience and trouble, as might happen when the unpitted fruit is found in pies, for example. A compromise is usually achieved where the output of the pitting machine is periodically checked to determine, if possible, the percentage of unpitted fruit in the particular lot and grade of cherries being processed, as most of the pitting failures are due to malformed fruit or an unnatural position of the pit within the fruit. As such anomalies vary with fruit from different localities or grown under different conditions, obviously an automatic pit inspector that can detect unpitted fruit and then separate them from the property pitted output is grealy to be desired from the point of view of cost reduction and to provide a high quality output.

It is, therefore, an object of the present invention to provide an accurate and efficient pit inspection and fruit sorting system in order to separate pitted from unpitted fruit. The present invention is ideally suited for incorporation into continuous and automatic cherry pitting machines as exemplified by the Connor et al. United States Patent No. 2,092,950.

Broadly stated as to apparatus, our invention comprises means for producing an electrical impulse when a pit is removed from a fruit by a pitting blade, means for cocking a sorting circuit by use of the impulse, and sorting means operating on the fruit after the pitting operation to segregate the properly pitted fruit from those with pits, the sorting circuit being triggered to operate the sorting means just as the fruit drop away from the blade.

Broadly stated as to method, we produce an electrical impulse by pit control after it has left the fruit, then use this impulse to partially energize a sorting circuit, then complete the circuit at the proper time to transport the properly pitted fruit to an output, the improperly pitted fruit falling into a separate output.

The present invention may be more fully understood by reference to the drawings, in which:

Figure 1 is a diagram of a conveyor and pitting blade assembly of the patent cited above incorporating one form of the present invention.

Figure 2 is a wiring diagram of a sorting circuit including the switches of Figure 1.

Referring first to Figure 1, a conveyor is fitted with fruit receptacles 1, perferably of rubber, having a bottom aperture 2 therein. The receptacles are continuously progressed under a pitting blade 3 working through a stripper plate 4, this blade 3 and stripper plate 4 being oscillated to follow a receptacle until pitting is completed and then returning to the original position for the blade to pit the fruit in the next arriving receptacle, as set forth in the patent cited above. As the blade rises and returns, fruit impaled by the blade 3 is removed by stripper plate 4. Normally, the removed fruit rolls off the end of the conveyor into an output container, whether or not it has had the pit removed by blade action.

In the present instance, to sense the removal of the pit, a stationary pit sensing switch 5 is placed beneath the receptacles. This switch has a wire finger 6 extending under each receptacle as it passes the point where the pit is forced through aperture 2 in the receptacle. The sensing switch is designed to make contact on very small movement of finger 6 in any direction caused by pit contact, as it is forced from the receptacle.

A firing switch 7 is mounted on blade holder 8 to move with it during blade operation. The firing switch can be of any microswitch type, set to make contact just as the lower end of the blade passes through the stripper plate to remove the fruit impaled thereon, this position being indicated by broken line 9. A stationary reset switch 10 is fastened on the frame of the machine forward of the oscillating blade and stripper plate and is set to make contact with the blade support at the forward end of the blade oscillation just as the blade starts downwardly to operate on a fruit about to be pitted, this position being indicated by broken line 11.

Mounted on stripper plate 4 and moving with it is an air jet pipe 12 with an open jet end 13 directed toward the position a fruit would be just as it is forced off the pitting blade by the stripper plate.

The three switches described above are utilized in the circuit shown in Figure 2. Here, the sensing switch 5 is led through an input network comprising an input capacity 14 and parallel resistances 15 and 16, to the trigger grid 17 of a thyratron 18 whose anode 19 is fed from a rectifier tube 20 through the normally closed reset switch 10 and relay winding 21. A pair of relay contacts 22 are fed through ground wire 23 having a 16 mfd. condenser 24 therein, by an unfiltered dry type rectifier 25. Firing switch 7 is in series with the rectifier 25 and an electrically operated air valve 26 with wire return to the relay contacts 22. Air under pressure is supplied to air valve inlet 27, and air valve outlet 28 is connected to jet 12 mounted on stripper plate 4 through a flexible hose 29.

Alternating current is supplied from power pack 30 having winding terminals X for supplying the cathode 31 of thyratron 18 and winding terminals Y supplying the cathode of the rectifier tube 20.

Following through one cycle of operation, the circuit may be first considered just after the stripper plate has opened reset switch 10 and moved away slightly to close it again. Thus thyratron 18 is not passing curent, and relay contacts 22 are open. Sensing switch 5 is open and firing switch 7 is open.

The pitting blade then starts down to contact a cherry in the underlying receptacle, and moves with the receptacle while the blade passes through the cherry to force the pit through aperture 2 in the bottom of the receptacle.

As the pit leaves the receptacle, the pit sensing finger 6 is touched by the pit 31 and impulse contact is made in the sensing switch 5 igniting the thyratron through input capacity 14. The thyratron then continuously passes current to energize relay winding 21 and to hold relay contacts 22 closed. However, the firing circuit is still open, because firing switch 7 is open. However, this switch later closes but only when the pitting blade rises and the cherry is about to be released therefrom, as described above.

When both relay contacts 22 and firing switch 7 are closed, condenser grid 24 discharges as a pulse through solenoid air valve 26, momentarily opening the air valve 26 to allow an air jet pulse to be passed through jet 12 attached to stripper plate 4. This jet blows the cherry as it falls off the blade outwardly into a conveniently positioned output bin 32 as shown in Figure 1. As the knife and stripper plate complete the return and again reach the forward end of the blade travel, the reset switch 10 is again momentarily opened, the thyratron ceases to pass current and relay contacts 22 open. Then as the knife starts down to pit the next arriving cherry, the circuit is ready for the next cycle.

If, however, no pit was removed by the pitting blade, the sensing switch could not be closed, the thyratron does not pass current and relay contacts 22 remain open. Then when firing switch 7 is closed the air valve does not operate, and no air blast occurs as the cherry drops off the pitting blade. The cherry then drops by gravity outside of bin 32 into a special chute 33 and thus cannot get into the properly pitted fruit output. Thus, the cherries are segregated in accordance with whether or not they have had a pit removed.

Several important points should be noted. The device as described will ordinarily "fail safe" because of several features. For example, capacity 14 in the thyratron input circuit permits only a change in control current to energize the thyratron. Thus, if sensing switch 5 is jammed closed by a pit, the thyratron will not pass current except for the initial closing of the sensing switch, thus all following fruit passes into the improperly pitted fruit output bin 33. Likewise, condensor 24, in the firing circuit, insures that only a momentary air blast can issue from jet pipe 6.

Thus, by producing an impulse representing the extraction of a pit, and using this impulse to set up a current path, then later using this current path to control energy to sort the properly pitted fruit from those improperly pitted, we have been able to reduce the appearance of unpitted fruit in the output of a continuous fruit pitting machine to an insignificant amount, and then such failures are almost invariably due to pit breakage or abnormally small or immature pits. Even the latter failures can be substantially eliminated by grading the fruit for size before running it through the pitting machine.

We claim:

1. In a fruit pitting machine having fruit receptacles progressing serially under a reciprocating pitting blade operating through a stripper plate, means for moving said pitting blade through said fruit to normally force a pit through a bottom aperture in a receptacle, electrical sensing switch for detecting the emergence or non-emergence of a pit from said fruit, a jet directed at a fruit just being removed from said blade by said stripper plate after the pitting operation, an air valve connected to said jet and to a source of air under pressure, an electrical circuit partially completed only when said sensing switch has been closed and a firing switch cooperating with said knife to complete said circuit to operate said air valve when said fruit drops from said blade whereby said fruit is transported away from said blade by the air emerging from said jet.

2. In a fruit pitting machine having fruit receptacles progressing serially under a pitting blade operating through a stripper plate, the method of segregating pitted and unpitted fruit comprising the steps of forcing a pit from said fruit with said blade, creating an impulse resulting from pit contact only, utilizing said impulse to partially close a current path, completing said path just as the fruit is pushed off said blade by said stripper plate, and utilizing the current flow in said path to control a fluid jet positioned to transport the pitted fruit away from said blade.

3. In a fruit pitting machine having fruit receptacles progressing serially under a reciprocating pitting blade operating through a stripper plate, means for moving said pitting blade through said fruit to normally force a pit through a bottom aperture in a receptacle, sensing means for detecting the emergence or non-emergence of a pit from said fruit, a jet directed at a fruit, just being removed from said blade by said stripper plate after the pitting operation, an air valve connected to said jet and to a source of air under pressure, a valve actuating circuit partially completed by operation of said pit sensing means only when said sensing means has detected the emergence of a pit, and circuit completing means cooperating with said knife to complete said valve operating circuit to operate said air valve when said fruit drops away from said blade, whereby only a properly pitted fruit is transported away from said blade by the air emerging from said jet.

4. In a fruit pitting machine having fruit receptacles progressing continuously and serially under a reciprocating pitting blade operating through a stripper plate, means for moving said blade over a relatively short path in synchronism with said fruit receptacles, said blade being returned rapidly over said path to repeat the cycle, means for moving said pitting blade through said fruit while synchronously moving with a receptacle to normally force a pit through a bottom aperture in a receptacle, an electrical sensing switch for detecting the emergence or non-emergence of a pit from said fruit, a jet directed at a fruit just being removed from said blade by said stripper plate after the pitting operation, an air valve connected to said jet and to a source of air under pressure, an electrical circuit partially completed only when said sensing means has been closed, a firing switch cooperating with said knife to complete said valve operating circuit to operate said air valve when said fruit drops away from said blade, whereby only a properly pitted fruit is transported away from said blade by the air emerging from said jet, and a valve operating circuit clearing switch positioned to be operated by return of said knife to the beginning of the synchronous portion of said path.

5. Apparatus in accordance with claim 1 wherein said sensing switch has an operating arm below a receptacle through which a pit is being forced by said blade, said arm being positioned to be contacted by a pit emerging from the bottom aperture of the receptacle.

KEITH K. HARWORTH.
RANDALL U. TEMBY.

REFERENCES CITED

The following references are of record in the file of this patent:

UNITED STATES PATENTS

| Number | Name | Date |
|---|---|---|
| 1,921,863 | Bickley | Aug. 8, 1933 |
| 2,070,339 | Moore | Feb. 9, 1937 |
| 2,092,956 | Connor | Sept. 14, 1937 |
| 2,138,645 | Rey | Nov. 29, 1938 |
| 2,205,397 | Drake | June 25, 1940 |
| 2,232,207 | Carroll | Feb. 18, 1941 |
| 2,238,980 | Metcalf | Apr. 22, 1941 |
| 2,243,246 | Carroll | May 27, 1941 |
| 2,280,948 | Gulliksen | Apr. 28, 1942 |
| 2,298,613 | Carroll | Oct. 13, 1942 |